United States Patent
Silver et al.

(10) Patent No.: US 10,880,321 B2
(45) Date of Patent: Dec. 29, 2020

(54) METHOD AND SYSTEM FOR LEARNING REPRESENTATIONS OF NETWORK FLOW TRAFFIC

(71) Applicant: Vectra Networks, Inc., San Jose, CA (US)

(72) Inventors: Matthew R. Silver, Arlington, MA (US); Sohrob Kazerounian, Somerville, MA (US)

(73) Assignee: Vectra AI, Inc., San Jose, CA (US)

(*) Notice: Subject to any disclaimer, the term of this patent is extended or adjusted under 35 U.S.C. 154(b) by 243 days.

(21) Appl. No.: 15/881,760

(22) Filed: Jan. 27, 2018

(65) Prior Publication Data

US 2018/0219895 A1  Aug. 2, 2018

Related U.S. Application Data

(60) Provisional application No. 62/451,525, filed on Jan. 27, 2017.

(51) Int. Cl.
| | | |
|---|---|---|
| H04L 29/06 | (2006.01) | |
| G06N 5/02 | (2006.01) | |
| G06N 3/08 | (2006.01) | |
| H04L 12/26 | (2006.01) | |
| G06N 3/04 | (2006.01) | |
| H04L 12/24 | (2006.01) | |

(52) U.S. Cl.
CPC ....... *H04L 63/1425* (2013.01); *G06N 3/0454* (2013.01); *G06N 3/084* (2013.01); *G06N 5/02* (2013.01); *H04L 41/147* (2013.01); *H04L 41/16* (2013.01); *H04L 43/04* (2013.01); *H04L 43/062* (2013.01)

(58) Field of Classification Search
CPC ... H04L 63/1425; H04L 43/062; H04L 41/16; H04L 43/04; H04L 41/147; G06N 5/02; G06N 3/0454; G06N 3/084
See application file for complete search history.

(56) References Cited

U.S. PATENT DOCUMENTS

| | | | |
|---|---|---|---|
| 8,015,133 | B1 | 9/2011 | Wu et al. |
| 9,037,464 | B1 | 5/2015 | Mikolov et al. |
| 9,600,656 | B1 | 3/2017 | Wellinghoff |
| 9,843,596 | B1* | 12/2017 | Averbuch ............ H04L 63/1416 |
| 10,154,051 | B2* | 12/2018 | Sofka .................. H04L 63/1416 |
| 10,417,788 | B2* | 9/2019 | Risman .................... G06N 3/08 |
| 2008/0288330 | A1 | 11/2008 | Hildebrand et al. |
| 2015/0012751 | A1 | 1/2015 | Forster et al. |
| 2015/0039513 | A1* | 2/2015 | Adjaoute ........... G06Q 20/4016 705/44 |

(Continued)

OTHER PUBLICATIONS

Barlett Peter, Introduction to Series Analysis, Lecture-8, XP055455172, Jan. 1, 2010, p. 13 (Year: 2010).*

(Continued)

*Primary Examiner* — Shanto Abedin
*Assistant Examiner* — Kalu Kelly Emeaba
(74) *Attorney, Agent, or Firm* — Vista IP Law Group, LLP (57) ABSTRACT

Disclosed is an improved method, system, and computer program product for learning representations or embeddings of network flow traffic. The disclosed invention operates on network flow data which are then used as inputs to a deep-learning architecture that learns to embed the data into a vector space.

20 Claims, 5 Drawing Sheets

(56) References Cited

U.S. PATENT DOCUMENTS

| | | | |
|---|---|---|---|
| 2016/0105364 A1 | 4/2016 | Kanonakis et al. | |
| 2016/0219067 A1 | 7/2016 | Han et al. | |
| 2016/0299938 A1* | 10/2016 | Malhotra | G06F 17/18 |
| 2017/0053644 A1* | 2/2017 | Rennie | G06N 3/08 |
| 2017/0092297 A1* | 3/2017 | Sainath | G10L 25/30 |
| 2017/0251012 A1* | 8/2017 | Stockdale | H04L 63/1441 |
| 2017/0372201 A1* | 12/2017 | Gupta | G06N 3/084 |

OTHER PUBLICATIONS

Hochreiter, Sepp, and Jürgen Schmidhuber. "Long short-term memory." Neural computation 9.8 (1997): 1735-1780.

Mikolov, Tomas, et al. "Distributed representations of words and phrases and their compositionality." Advances in neural information processing systems. 2013.

Rumelhart, David E., Geoffrey E. Hinton, and Ronald J. Williams. "Learning representations by back-propagating errors." nature 323. 6088 (1986): 533-536.

Schuster, Mike, and Kuldip K. Paliwal. "Bidirectional recurrent neural networks." IEEE transactions on Signal Processing 45.11 (1997): 2673-2681.

Graves, Alex, Abdel-rahman Mohamed, and Geoffrey Hinton. "Speech recognition with deep recurrent neural networks." 2013 IEEE international conference on acoustics, speech and signal processing. IEEE, 2013.

Graves, Alex, and Navdeep Jaitly. "Towards end-to-end speech recognition with recurrent neural networks." International conference on machine learning. 2014.

Grossberg, Stephen. "A theory of human memory: Self-organization and performance of sensory-motor codes, maps, and plans." Studies of Mind and Brain. Springer, Dordrecht, 1982. 500-639.

Kohonen, Teuvo. "Self-organized formation of topologically correct feature maps." Biological cybernetics 43.1 (1982): 59-69.

McCulloch, Warren S., and Walter Pitts. "A logical calculus of the ideas immanent in nervous activity." Bulletin of mathematical biology 52.1-2 (1990): 99-115.

Anonymous et al: "Neural Networks for Time Series Prediction", 1' Jan. 2886 (2886-81-81), XP855455248, Retrieved from the Internet:URL:https://www.cs.cmu.edu/afs/cs/academic/class/15782-f86/slides/timeseries.pdf [retrieved on 2818-82-28].

Bartlett Peter: "Introduction to Time Series Analysis. Lecture 8", Jan. 1, 2010 (Jan. 1, 2010), XP055455172, Retrieved from the Internet:URL:https://www.stat.berkeley.edu/-bartlett/courses/153-fall2010/lectures/8.pdf [retrieved on Feb. 28, 2018]* pp. 11-13.

Iglesias Felix et al: "Analysis of network traffic features for anomaly detection", Machine Learning, Kluwer Academic Publishers, Boston, US, vol. 101, No. 1, Dec. 4, 2014 (Dec. 4, 2014), pp. 59-84, XP035536953, ISSN: 0885-6125, 001: 10.1007/S10994-014-5473-9 [retrieved on Dec. 4, 2014]* p. 65.

Extended European Search Report dated Mar. 12, 2018 for EP Appln. No. 18153780.4.

Foreign Office Action dated Mar. 6, 2019 for EP Appln. No. 18153780.4.

\* cited by examiner

METHOD AND SYSTEM FOR LEARNING REPRESENTATIONS OF NETWORK FLOW TRAFFIC

CROSS REFERENCE TO RELATED APPLICATIONS

The present application claims the benefit of priority to U.S. Provisional Application No. 62/451,525, entitled "METHOD AND SYSTEM FOR LEARNING REPRESENTATIONS OF NETWORK FLOW TRAFFIC," filed on Jan. 27, 2017, which is hereby incorporated by reference in its entirety.

BACKGROUND

In recent years, it has become increasingly difficult to detect anomalous network or malicious activity carried on networks. The sophistication of intrusions has increased substantially, as entities with greater resources, such as organized crime and state actors, have directed resources towards developing new modes of attacking networks.

Vector embedding may be used to perform types of data analysis. A popular type of vector embedding that is used to produce word embeddings is word2vec. These models learn to project sparse, high-dimensional word representations that are relatively uninformative, to dense, low-dimensional representations that carry contextual and semantic information about the word. This means that while words may be embedded based on predictions about context (or word sequences) in which they occur, network protocol embeddings will have to be learned by the relation between the full sequence and the properties of those sequences that the system is interested in. While word2vec is clearly designed to learn word embeddings, as yet h e are no similar embedding techniques in the domain of network traffic analysis. This may be due to the fact that there are significant differences in models that need to be generated between a word2vec type analysis and an analysis pertaining to network traffic flows.

What is needed is an improvement to vector analysis that is applicable to other domains such as the field of network analysis.

SUMMARY

In some embodiments, an approach for a method and system for learning meaningful vector embeddings that captures information about network traffic in a manner that is relevant to the domain of cybersecurity. The embodiments of this invention project long temporal sequences of flow data into compressed representations that preserve information relevant for doing downstream network anomaly detection, clustering, etc., without requiring the storage and processing of the whole sequence. The embodiments of the invention use a deep neural network architecture that learns to predict a network protocol through training, repeated presentations of sessions and updates the system based on the success or failure of the predictions. The embodiments of the invention can be trained to predict any aspect of sessions based on any characteristic time series. The disclosed embodiments modify and improve over legacy approaches. Such technical solutions, serve to reduce use of computer memory, reduce demand for computer processing power, and reduce the demand for inter-component communication. In particular, practice of the disclosed techniques reduces the use of computer memory including non-volatile storage, reduces communication overhead needed for learning meaningful vector embeddings, and results in faster computation time without sacrificing network detection analysis as occurred in prior processes.

In some embodiments, an approach is described to learn a projection from a sequence of flow data to an embedding space that not only preserves information about the sequential statistics of the flow data itself, but also about other pertinent information such as protocol related information. These learned embeddings are useful for detecting anomalous traffic patterns, clustering similar network connections, determining which hosts have similar connection patterns, and visualizing sequential traffic data in a simple and effective matter. Given the rapid growth of network connected devices and data transmission rates, it is critically important that malware and anomaly detection algorithms be able to process and store the necessary amount of traffic data to operate correctly.

Further details of aspects, objects, and advantages of some embodiments are described below in the detailed description, drawings, and claims. Both the foregoing general description and the following detailed description are exemplary and explanatory, and are not intended to be limiting as to the scope of the embodiments.

BRIEF DESCRIPTION OF THE DRAWINGS

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the methods, systems, and articles of manufacture will now be described in detail with reference to the drawings, which are provided as illustrative examples of the invention so as to enable those skilled in the art to practice the invention. Notably, the figures and the examples below are not meant to limit the scope of the present invention. Where certain elements of the present invention can be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, the present invention encompasses present and future known equivalents to the components referred to herein by way of illustration.

Various embodiments of the invention are directed to a method, system, and computer program product for learning meaningful vector embeddings to detect anomalous behavior on networks. This invention proposes a method for learning meaningful vector embeddings that capture information about network traffic in a manner that is relevant to the domain of cybersecurity. The vector embeddings proposed herein rely on the principle that network traffic with similar protocols, transferred volumes of data, and temporal properties should be mapped to similar portions of the "semantic" space. By using the aforementioned properties to determine how network traffic should be represented in an embedding space, the learned embeddings are useful for the task of detecting anomalous traffic patterns, clustering similar network connections, determining which hosts have similar connection patterns, and visualizing sequential traffic data in a simple and effective manner.

For illustrative purposes this document will specifically describe protocol analysis and therefore network flows are being embedded. However, it is noted that while this document illustratively refers to protocol, it is noted that this invention is indeed broad enough to be applicable to other types of analysis as well. Therefore, protocol is only used for the sake of illustration and as an example Before describing the examples illustratively depicted in the several figures, a general introduction to machine learning and vector embedding functions for traditional Natural Language Processing (NLP) is provided to further understanding. One of the primary questions in the field of machine learning, wherein computer algorithms learn without the need for explicit programming, concerns how to best represent data in order to be input to an algorithm. For example, in the field of speech recognition, an acoustic signal can either represented as the 1-dimensional time-varying waveform produced by a microphone, or alternatively, processed into a sequence of Fourier coefficients which represent the statistics within any short (e.g., 25 millisecond) window of the acoustic signal. Although both the time and Fourier domain signals are effectively equivalent, speech recognition algorithms often perform far better when using Fourier coefficients as inputs.

Although, in certain domains, it is possible to pre-specify engineered input representations that work well, this is often not the case. Real-world data are often quite messy, and cannot be easily represented in a form that is amenable to the types of inputs required by machine learning algorithms. As such, there is an interest in algorithms that can learn their own input feature representations—obviating the need for engineers to determine which representations might work best across various problem domains. This interest has also been spurred in large part due to the success of a class of algorithms loosely referred to as Deep Learning, or Neural Network algorithms. Although these algorithms were first introduced more than half a century ago, they have only become practical more recently, as a result of the exponential increase in both computational power as well as data from which to learn.

Many of these models take their inspiration from the brain by using a network of neurons connected by a set of 'synaptic' weights between them. When an input is presented to the model, the model can make an initial guess about what that input represents (e.g., which phonemes or words are in an acoustic signal, which faces are in a picture, etc.). Because the weights in the model are initially set to random values, the model effectively performs no better than chance at first. Over time however, it will learn to modify its weights in order to make increasingly better predictions, or conversely, to make fewer errors.

To see how vector embeddings function, it is useful first to consider how words and text were represented in more traditional (NLP) approaches. In NLP, the goal is often to train algorithms that can learn to 'understand' and make predictions from text (e.g., attempting to automatically classify the sentiment of a user review for a product on Amazon.com). In order to do this, traditional techniques often treated a document or text as a collection of words, with each word represented as a vector the length of the dictionary relevant to that domain (e.g., when classifying amazon reviews, it may not be relevant to have a dictionary that includes technical scientific terms). For example, assume a dictionary has 50,000 words, each word would be represented as a vector of length 50,000, with a value of '0' at all indices except for the index of the given word, which would have a value of '1'. This representation is known as 1-hot, since only one index in the full vector will be set to 1, with the rest being set to 0. If the word 'car' is the third word in this dictionary, and 'truck' the fifth, their 1-hot vector representations would look as follows:

'car'=[0, 0, 1, 0, 0, . . . ]
'truck'=[0, 0, 0, 0, 1, . . . ]

A document would then be represented by the collection of all such 1-hot vectors for the words in the document. Some NLP algorithms might process these vectors sequentially in the order of the words from that document, whereas others might choose to simply sum all the vectors from the document, to get a static representation of the document (although the latter representation necessarily removes sequential information, making it impossible to distinguish between sentences like "John hit Mary" and "Mary hit John"). Regardless of this however, the 1-hot word vectors are relatively uninformative. Words like 'car' and 'truck' have 0-bits in common, meaning they are as (dis)similar to one another as they are to any other word. Yet intuitively, 'car' and 'truck' are more similar to each other than they are to the words 'lizard', 'exist', or 'be'. These similarities are precisely what vector embeddings learn to represent. For example, imagining that the size of the embedding vector for the words shown earlier is set to 3, the embeddings themselves might look something like the following:

'car'=[−0.3, 1.2, 0.6]
'truck'=[−0.2, 1.1, 0.4]
'exist'=[1.4, 0.8, −0.2]

In the sample embedded vectors described above, the representations for 'car' and 'truck' now more closely mirror one another, than when they were simply represented by 1-hot vectors. Because 'car' and 'truck' are have similar representations, any prediction or inference system that uses them as inputs, can transfer what it learns from one to the other. For example, if a model learns that a 'car' has brakes, it will also implicitly learn, to a certain degree, that a 'truck' has brakes. This occurs because a learning algorithm will now learn over a whole region in the embedding space, rather than a specific symbolic entity representing a word. Conversely, the learning algorithm is less likely to mistakenly learn that words that are projected to distant parts of the embedding space correspond to objects that have brakes.

In addition to the difficulties of processing sequential data in NLP tasks, wherein sequences of words are used to learn embeddings for each individual word, further complexity is added when trying to process sequential data in the field of network security. First, while in the NLP examples explained above embedded representations are being learned for individual words, the method proposed herein learns embedded representations of entire sequences of network traffic. Second, in the NLP examples explained above, the analysis does not care about whether there were temporal pauses between the words or if it took a time period to express the sentences—the analysis is simply concerned about the sequence of words. In contrast, in the network security field, there may be time series data with concerns such as the time window, sliding time window, or overlapping time series or temporal data with specific timings of when packets arrived, when packets are delivered or time between received data packets.

This system describes a method for learning meaningful vector embeddings that capture information about network traffic in a manner that is relevant to the domain of cybersecurity. However, while vector embeddings in the NLP domain rely on the principle that words occurring in syntactically similar positions should be represented similarly in semantic space, the vector embeddings proposed herein rely on the principle that network traffic with similar protocol, transferred volumes of data, and temporal properties should be mapped to similar portions of the semantic space. Specifically, this means that while words are embedded based on predictions about the contexts (or word sequences) in which they occur, network protocol embeddings will have to be learned by the relation between the full sequence and the properties of those sequences that the system is interested in, as the system wants to learn to embed the full sequence itself.

Figure 1:
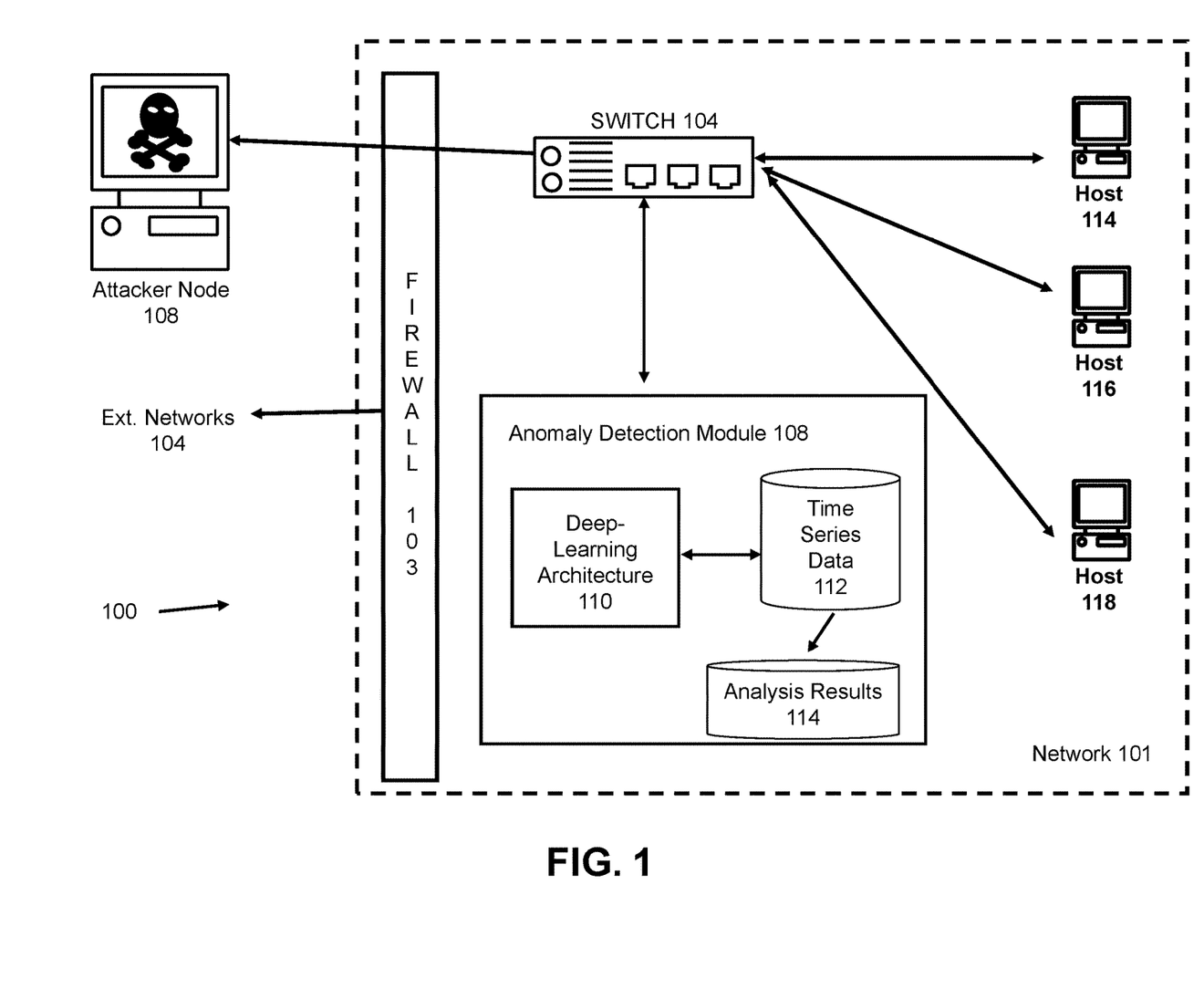
FIG. 1 illustrates an example environment in which an anomaly detection module may be implemented to learn representations (or embeddings) of network flow traffic as according to some embodiments.

FIG. 1 illustrates an example environment 100 in which an anomaly detection module 108 may be implemented to learn representations of network traffic flow. Here, an example network 101 comprises one or more hosts (e.g. assets, clients, computing entities), such as host entities 114, 116, and 118, that may communicate with one another through one or more network devices, such as a network switch 104. The network 101 may communicate with external networks through one or more network border devices as are known in the art, such as a firewall 103. For instance, host 114 may communicate with an external server on node 108 through network protocols such as ICMP, TCP and UDP.

However, it is possible that the external server is an attacker node 108 that seeks to infiltrate network 101. By way of example, a method which an attacker may choose to penetrate a network through the firewall 103 is by using a particular service or protocol (e.g., SSH) on a non-standard port (e.g., port 80, which is typically used for HTTP data), in order to mask or hide the connection from security analysis or network administrators.

In particular, given sequences of network flow data for connections on a network 101, the system 100 can represent the network traffic data in a compact form which will allow the system to predict whether or not the connection is anomalous (e.g., whether the connection indicates a potential threat to the network). The system 100 can also automatically learn representations that enable clustering and visualizing similar types of connections and protocols without having to build in a priori assumptions regarding the types of network services and traffic that might be expected on the network 101.

As described in more detail below, the anomaly detection module 108 operates by performing semi-supervised machine learning for learning representations (or embeddings) of network flow traffic which can then be used to identify, cluster, and make predictions regarding the security and anomalous patterns of traffic in the network 101. The system operates on raw network flow data, which are used as inputs to a deep-learning architecture 110 that learns to embed the data into a more meaningful vector space. These embeddings are designed to leverage representation learning in order to determine how network traffic data can be effectively understood through Machine Learning (ML) and Artificial Intelligence (AI). Further details regarding an approach to use the trained model are described below in conjunction with the description of FIGS. 3 and 4.

By projecting network traffic flow traffic into an embedding space, the system can represent a sequence of flow data as a static vector which preserves meaningful information about the connection it represents. Given the embedding vector derived from the connection traffic, the system can then use a downstream classifier in order to predict whether or not the connection looks more like standard SSH or HTTP traffic.

The advantage of this approach is that by using protocol embeddings for network traffic, the system 100 is able to project potentially long temporal sequences of flow data into compressed representations that preserve information relevant for performing downstream anomaly detection, or clustering, without parsing the network data flow, deep packet inspection, or requiring the storage and processing of the whole sequence.

The anomaly detection module 108 may be configured to monitor or tap the network switch 104 to passively analyze the internal network traffic in a way that does not hamper or slow down network traffic (e.g. by creating a copy of the network traffic for analysis). In some embodiments, the anomaly detection module 108 is an external module or physical computer that is coupled to the switch 104. While in some embodiments, the anomaly detection module 108 may be directly integrated as an executable set of instructions into network components, such as the switch 104 or a firewall 103. While still, in some embodiments the anomaly detection module 108 may be integrated into one or more hosts, in a distributed fashion (e.g. each host may have its own set copy of the distributed instructions and the hosts collectively agree to follow or adhere to instructions per protocol to collect and analyze network traffic). While in some embodiments, the anomaly detection module 108 can be implemented within one or more virtual machine(s) or containers (e.g., operating system level virtualized-application containers, such as Docker containers and/or LXC containers) sitting on one or more physical hosts. Still in some embodiments the anomaly detection module 108 may be integrated into a single host that performs monitoring actions for the network 101.

In the illustrated environment, the hosts may connect to one another using different network communication protocols such as ICMP, TCP or UDP. The anomaly detection module 108 may be configured to work as a passive analysis device that can receive, store, and analyze all network traffic sent/received by a single host, or a multitude of hosts. In some embodiments, all network communications may be passed through the switch 104 and the anomaly detection module 108 may tap or span (TAP/SPAN) the switch 104 to access and create a copy of the network communications; for example, by performing a packet capture and saving the network communications in one or more packet capture files. Once received, the network communications may be parsed into flows that correspond to sessions.

Any of the data used or created within this system, such as the time series data 112, and/or the analysis results 114, may be stored within a computer readable storage medium. The computer readable storage medium includes any combination of hardware and/or software that allows for ready access to the data that is located at the computer readable storage medium. For example, the computer readable storage medium could be implemented as computer memory and/or hard drive storage operatively managed by an operating system, and/or remote storage in a networked storage device. The computer readable storage medium could also be implemented as an electronic database system having storage on persistent and/or non-persistent storage.

Figure 2:
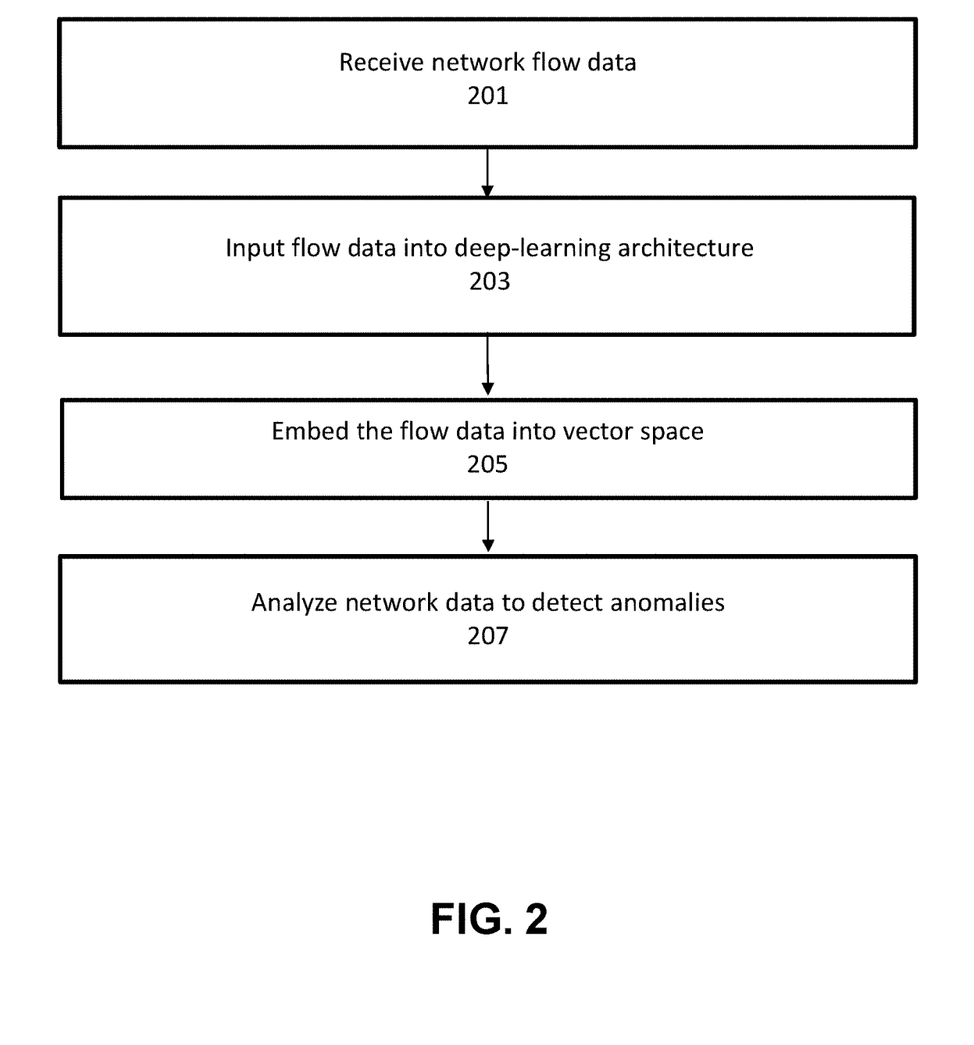
FIG. 2 shows a flowchart of an approach to implement use of the trained model according to some embodiments of the invention.

FIG. 2 shows a flow chart approach to implement use of the trained model according to some embodiments of the invention. The process is used to learn a projection from a sequence of flow data to an embedding space which not only preserves information about the sequential statistics of the flow data itself, but also protocol related information.

At 201, the network flow data to be analyzed is received. As previously noted, the network flow data can be performed on a session basis.

At 203, the network flow data is inputted into the deep-learning architecture. Further details regarding the deep-learning architecture is described below in conjunction with the description of FIGS. 3 and 4.

At 205, the network flow data is embedded into a vector space. By projecting network flow data into an embedding space, a sequence of flow data can be represented as a static vector which preserves meaningful information about the network connection it represents.

Analysis is performed on the network data to analyze any network anomalies at 207. Similar patterns of traffic flow with similar protocols and data transmission statistics will be mapped into similar regions of the embedded space. The embedded vectors for a set of connections can then be clustered together or can be used to make predictions about the connection itself. Due to the deep-learning architecture, a sequence of network flow will provide a high-level encapsulation of network properties. As such, different static representations of time sequences of varying lengths may be properly compared to each other.

As can be appreciated, with a robust training session and viable session embeddings, there is a broad set of possibilities to utilize this session for network analysis. One way to utilize this system is to examine sessions occurring on a specific port, identifying those that are predicted incorrectly, and subjecting them to further scrutiny. If the system fails to predict the port associated with a session, then it is possible that the session does not look like others on the same port. Alternatively, we can take sessions that are known to be non-standard, and examine the system's response to them.

When a session whose timeseries is atypical (relative to other sessions using the same protocol), the system will be unable to predict the correct protocol, or will do so with a low degree of confidence. An incorrect or low-confidence prediction is indicative of anomalous sessions possibly from a threat. One or more threshold levels can be established to numerically identify whether the incorrect or low-confidence prediction can be classified as being abnormal. From this prediction, if it is determined that the behavior is equal to or beyond a threshold limit, then an alarm (e.g., alarm data, reporting data, output data) may be generated and output. For example, if an attacker is running a hidden tunnel inside HTTPS sessions, the system may fail to predict that the protocol is HTTPS because the statistics of the time-series may be different than typical HTTPS sessions. Furthermore, the embedded representation may be dissimilar from HTTPS, but similar to another protocol which can be used to identify the session's true protocol (i.e., the protocol that is hidden inside the tunnel).

Figure 3:
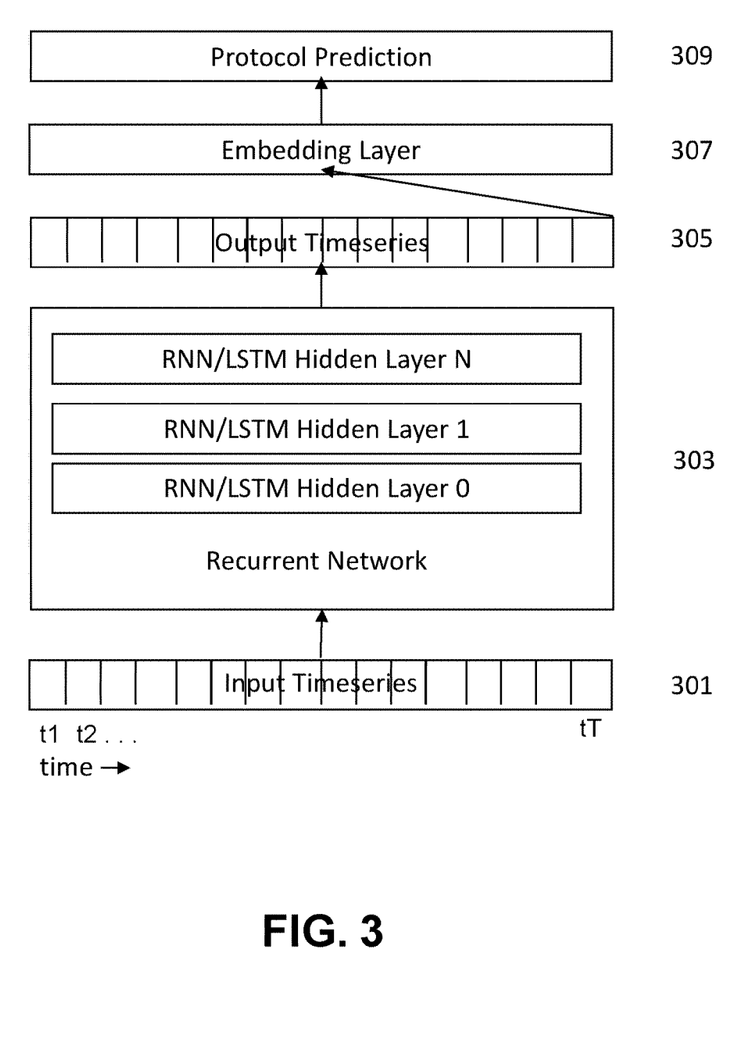
FIG. 3 shows a flowchart of an approach to implement vector embedding of network traffic with a recurrent neural network according to some embodiments of the invention.

FIG. 3 shows a flowchart of an approach to implement vector embedding of network traffic according to some embodiments of the invention. The system learns an embedding by using an architecture known as a Recurrent Neural Network (RNN).

An RNN is a general deep-learning architecture, in which cyclic connections occur throughout the network of neurons and their interconnections. As such, these models readily process sequential data, as information can be retained through a form of memory provided by their recurrent connections. In some embodiments, a particular RNN can be used for demonstration of protocol embeddings uses multiple layers of Long Short-Term Memory (LSTM) cells (as these cells tend to outperform standard RNN cells) that are capable of learning order dependence in sequence prediction problems.

A LTSM is a specific RNN architecture that is well-suited to learn from experience to classify, process, and predict time series with time lags of unknown size. The architecture of LSTMs is composed of units called memory blocks. A memory block contains memory cells with self-connections storing (or remembering) the temporal state of the network in addition to special multiplicative units called gates to control the flow of information. Each memory block contains an input gate to control the flow of input activations into the memory cell, an output gate to control the output flow of cell activations into the rest of the network and a forget gate. The forget gate will scale the internal state of the cell before adding it back to the cell as input through self-recurrent connection, therefore adaptively resetting the cell memory.

Once a full sequence of data corresponding to a connection has been input to the network, activations in the network flow to a projection layer (or embedding layer) from the final recurrent layer. The size (i.e., number of neurons) of this projection layer (or embedding layer) determines the dimensionality of the learned vector embedding. The value at the projection layer at the final time-step is used as the actual embedding value for the network traffic, and that value is then passed to an output layer of neurons, wherein each neuron represents one of the Y protocols the connection could have occurred on. Structured in this way, the model can be viewed as taking in an input sequence of flow data, constructing a static representation or embedding of that traffic once the full sequence of inputs has been presented, then outputting a set of values (or probabilities) corresponding to a prediction about which protocol was used in the network flow from which the input sequence was generated.

The model initially has only random weights between neurons and so effectively uses random projections, and performs at chance in predicting the network protocol, prior to training. By training the model (in this case, with an algorithm known as backpropagation through time), the system is essentially constructing a classifier for predicting the protocol of the connection, simply from the sequence of flow statistics, which outputs as an intermediate step in the learned embedding for the sequence itself.

A neural network is constructed with an input layer at 301 that is connected via a set of random weights to the first recurrent layer. The recurrent layer is composed of LSTM cells. In other embodiments, alternatives such as standard RNN, Gated Recurrent Unit (GRU), or Rectified Linear Unit (RelU) cells can also be used. The first recurrent layer is connected to the second, and the second to the third via new sets of randomized weights at 303. The recurrent layers transform the input sequence into complex features representations, which once the sequence has finished, projects these representations into an embedding layer. The final recurrent layer is then connected to a projection layer, which ultimately serves as the embedding layer at 307 once training is complete. The value at the embedding layer at this point is taken to be the embedding representation for the whole sequence. Finally, the projection layer is connected to an output layer 309, which contains a node for each of the possible protocols on which the input sequence may occur.

A consequence of training this structure, as opposed to word2vec which is learned in fully unsupervised fashion, is that in the process of training the vector embeddings, the system actually builds a fully functional classifier that can predict port/protocol from a sequence of input flow statistics.

An input sequence, representing the network flow for a connection between a client and server, is presented to the network, an individual time slice at a time in sequential order. As an example, the network flow may contain seven features that describe the data transferred within several time slices:

TABLE 1

Network flow features described within time slices

| Feature | t = 0 | t = 1 | t = 2 | ... | t = T |
|---|---|---|---|---|---|
| bytes sent | 345 | 2802 | 0 | ... | 457 |
| bytes received | 2453 | 0 | 2723 | ... | 122 |
| packets sent | 6 | 14 | 0 | ... | 4 |
| packets received | 10 | 0 | 12 | ... | 2 |
| client first | 1 | 1 | 0 | ... | 1 |
| client last | 0 | 1 | 0 | ... | 1 |
| skip | 0 | 5 | 0 | ... | 2 |

At every time step during which a time slice of flow data is presented to the neural network, activity flows from the input layer through its weights to the first recurrent layer, then through each subsequent recurrent layer. The activity at any recurrent layer is a function not only of the inputs from the previous layer at the current time step, but also from the activity at the current layer from the previous time step, via recurrent weights from the layer onto itself. As the full input sequence is presented, the output of the final recurrent layer will be a sequence of M values for T time-steps, where M is the number of units or cells in the final recurrent layer, and T is the number of time-steps in the original input timeseries. In some embodiments, the system only cares about the final time step of the recurrent layer output because the network attempts to make a prediction about the protocol only after the full time-series of network traffic has been presented.

This final time step value is projected from the final recurrent layer to the projection layer (or embedding layer), and finally from the projection layer to the output layer, via sets of weights. At the output layer, each cell (or unit/node/neuron) represents one of the possible protocols which the network traffic may have occurred on. For example, FTP, HTTP, DNS, and so on. The activity at the final layer represents a prediction about the probability that the network traffic occurred using each of the possible protocols. At first, because the weights throughout the network are initialized randomly, the prediction for each protocol is essentially random.

Once a prediction is made however, the network weights can be updated during training with backpropagation (through time), such that the next time the network sees a similar input time-series, it will be more likely to predict the correct protocol. Over time, as the weights are updated in this manner, the network not only becomes increasingly likely to correctly predict the protocol over which network traffic occurred, but moreover, the activity at the projection layer (i.e., the embeddings of the network traffic input sequence) will map similar input sequences to similar embedding values.

After training is completed, the system can take any novel (e.g., unseen) network flow data for a given connection, and project it into the embedding space. Once a system has been trained to predict network anomaly behavior in a network flow given the underlying time series data, novel network flows can be presented to the system. Those network flows will be embedded in the learned vector space and mapped to a protocol.

In some embodiments, after the process of training the vector embeddings, the RNN may also be used as a functional classifier which can predict the port or protocol from a sequence of input flow statistics.

Figure 4:
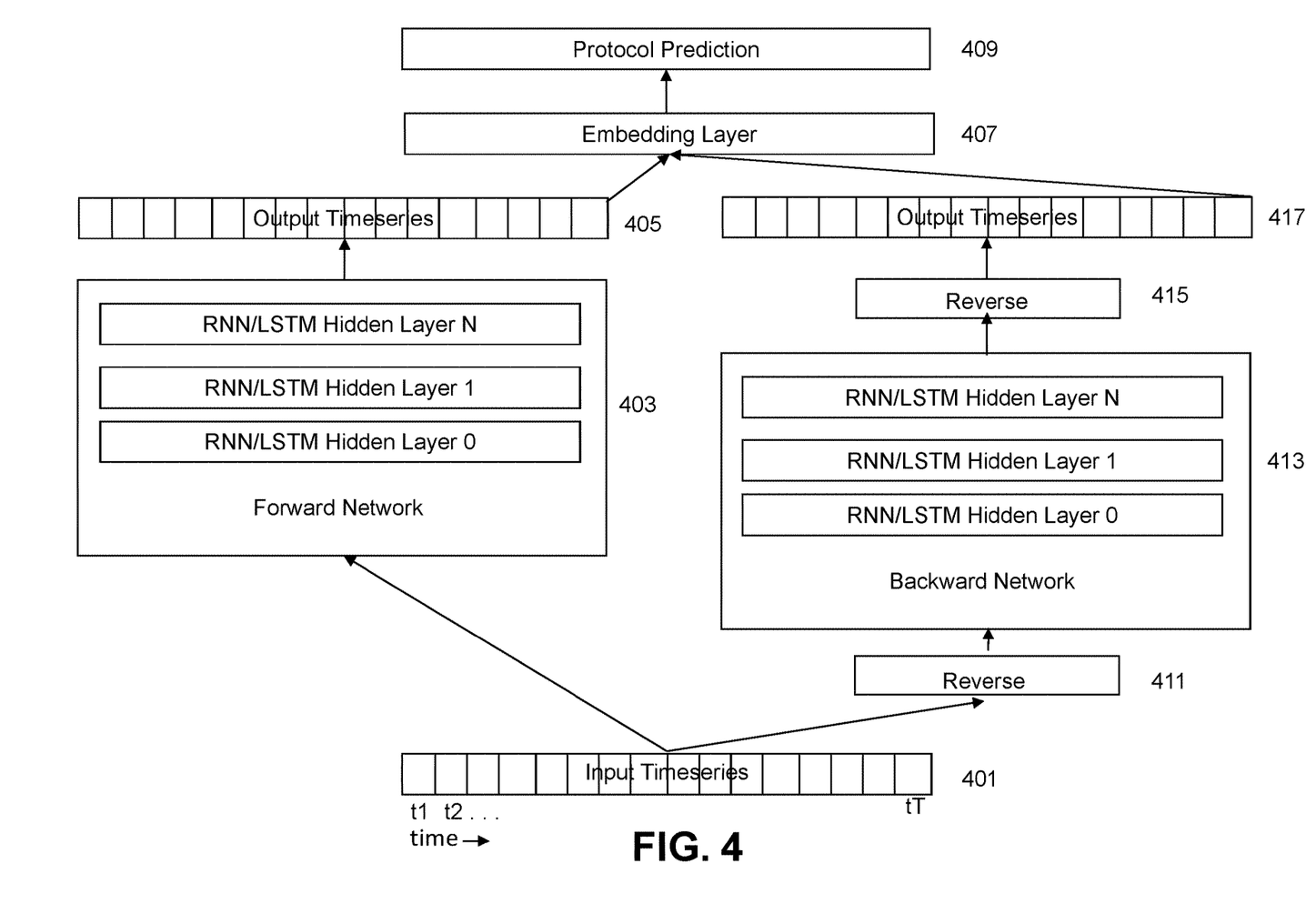
FIG. 4 is a flowchart of an approach to implement vector embedding of network traffic with two (bidirectional) recurrent neural networks according to some embodiments of the invention.

FIG. 4 is a flowchart of an approach to implement vector embedding of network traffic according to some embodiments of the invention. In some embodiments, two (i.e. in a bidirectional architecture) recurrent neural networks (RNNs), each comprised by several layers of long short-term memory (LSTM) units, etc.

This type of network comprises two subnetworks: one that processes the timeseries in time order (the "Forward Network") and one that processes the timeseries in reverse-time order (the "Backward Network"). When a timeseries is presented to the network, each of these subnetworks produces a timeseries of its own—these output timeseries are antecedent to the subnetworks' projections of the timeseries into a space that contains the information necessary for network anomaly analysis. Once each subnetwork has produced its own output timeseries, the last and final state of each timeseries is projected to an output layer that predicts a probability for each protocol in an effort to reproduce a one-hot representation. In some embodiments, the one hot representation may be used for a "target" against which the system's performance is evaluated.

At 401, an input time series where each slice is presented sequentially (e.g., forward in time to the forward network and backwards to the backward network) to the forward network and backward network. In some embodiments, each of these systems will make its own prediction of what the protocol will be.

In the forward network, time is presented in a chronological order. The process at 403 and 405 for processing the data in a forward chronological order is explained in greater detail in FIG. 3.

In the backward network, the time is presented in a reverse chronological order at 411. As explained above, the process at 413 is also explained in greater detail in FIG. 3. In the backward network, the system implicitly performs a flipping operation at 415 to compensate for the reverse chronological order before taking the output to the projection layer at 407.

The system then takes both outputs from the forward network and backwards network to the projection layer (or embedding layer) at 407, and, finally, from the projection layer to the output layer 409, via sets of weights.

This type of system, which is general and can be trained to predict any aspect of sessions based on any characteristic timeseries, can be used in a variety of ways to model network data beyond the session level, for example learning embeddings for hosts or users. Thus, beyond the individual capability of the network described above, this system should be considered representative of a timeseries-based embedding approach that facilitates modeling of network data as a whole.

Therefore, what has been described is an improved method, system, and computer program product for learning representation of network flow traffic. The protocol embeddings can successfully be used as inputs to a variety of downstream algorithms that are meant to identify malicious and anomalous network flows. As mentioned, the system can use these embeddings to predict whether or not an attacker is abusing or misusing a particular port and protocol, as occurs when an attacker hides a tunnel in an otherwise innocuous protocol such as HTTP. Furthermore, the system can use sequences of these embeddings, to build new, higher-order embeddings that represent larger temporal scales, as well as full embeddings for a host or server across a number of connections.

System Architecture Overview

Figure 5:
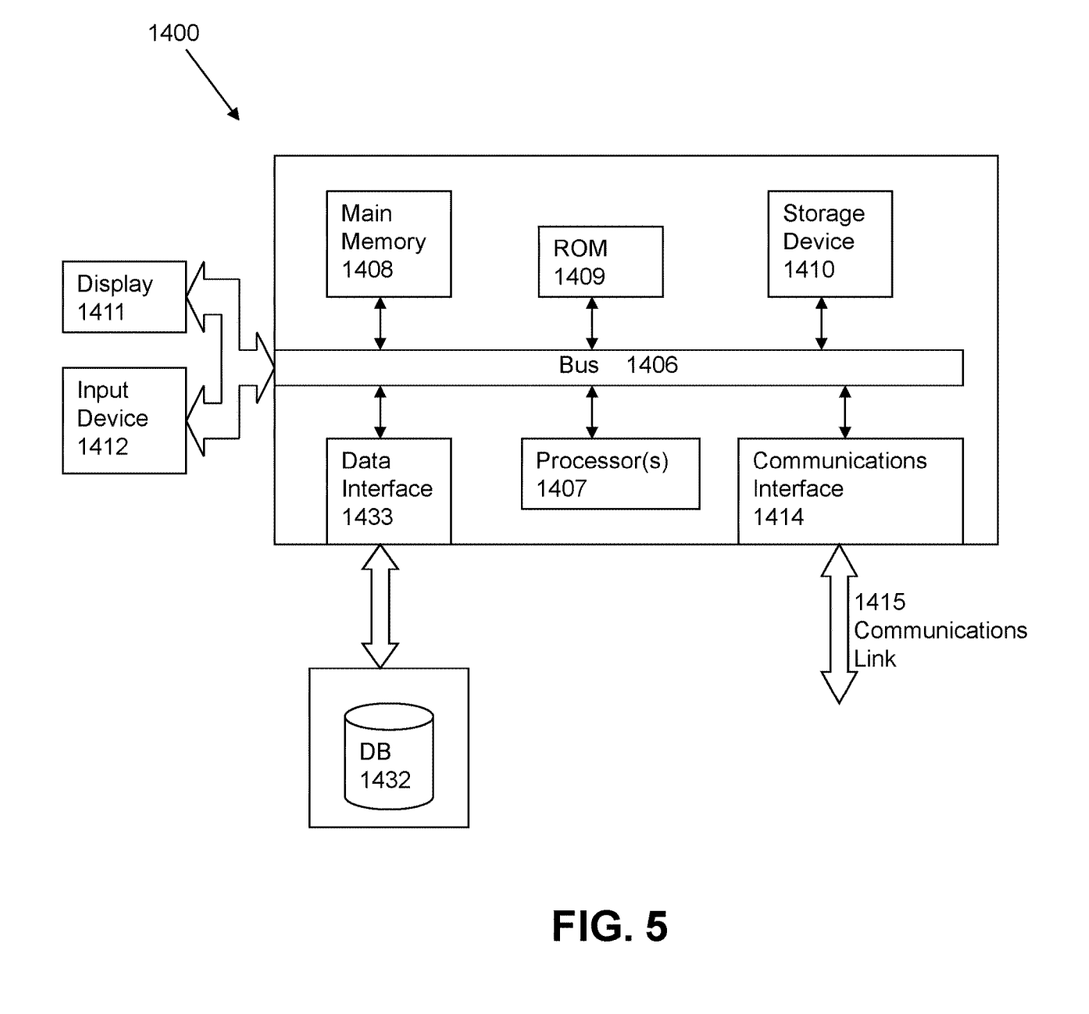
FIG. 5 is a block diagram of an illustrative computing system suitable for implementing an embodiment of the present invention.

FIG. 5 is a block diagram of an illustrative computing system 1400 suitable for implementing an embodiment of the present invention for performing intrusion detection. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control. A database 1432 may be accessed in a storage medium using a data interface 1433.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A method for detecting anomalous behavior in network traffic, the method comprising:

monitoring network traffic in a network, wherein the network traffic is separated into network flow data that comprises individual time slices;

constructing a first model that predicts aspects of the network traffic, wherein the first model processes sequences of network data to learn representations of the network data;

using the first model to embed a sequence of network data into a first vector space, the sequence of network data comprising an ordered sequence of the individual time slices;

constructing a second model that predicts aspects of the network traffic, wherein the second model processes sequences of network data in reverse-time order to learn representations of the network data using the second model to embed the sequence of network data into a second vector space, wherein individual time slices from the sequence of network data are provided to the second model in reverse chronological order, and an output of the second model is reversed before being embedded into the second vector space;

combining output vectors from processing a same individual time slice from both the first model in the first vector space and the second model in the second vector space into a projection layer;

analyzing the combination of the output vectors corresponding to the sequence of network data to predict an aspect of the network traffic; and generating data that indicates a network anomaly if abnormal behavior is identified.

2. The method of claim 1, wherein constructing the first model or the second model further comprises:
  constructing an input layer that is connected with a first randomized weight to at least a recurrent layer from among one or more recurrent layers;
  constructing the one or more recurrent layers that are composed of long short-term memory cells, wherein the long short-term memory cells corresponds to memory blocks;
  constructing a projection layer that corresponds to an embedding layer, wherein the projection layer connects to the one or more recurrent layers with a second randomized weight; and
  constructing an output layer that comprise nodes that correspond to protocols where an input sequence occurs, wherein the output layer is connected to the projection layer.

3. The method of claim 1, further comprising:
  constructing a classifier that predicts a port or protocol of the network traffic.

4. The method of claim 1, wherein the first model or the second model predicts a network connection protocol or port for the network traffic.

5. The method of claim 1, wherein the network flow data comprises information that describe data transferred within periodic time slices with at least one of bytes sent, bytes received, packets sent, packets received, client first, client last, or skip.

6. The method of claim 1, further comprising transforming an output of the second model to compensate for the reverse chronological order before sending the output of the second model to a projection layer.

7. The method of claim 1, wherein the data is generated based at least in part on a threshold being exceeded.

8. The method of claim 1, wherein the network traffic is received passively through a switch.

9. A computer program product embodied on a non-transitory computer readable medium, the computer readable medium having stored thereon a sequence of instructions which, when executed by a processor causes the processor to execute a set of acts for learning representations of network flow traffic to detect anomalous behavior, the set of acts comprising:
  monitoring network traffic in a network, wherein the network traffic is separated into network flow data that comprises individual time slices;
  constructing a first model that predicts aspects of the network traffic, wherein the first model processes sequences of network data to learn representations of the network data;
  using the first model to embed a sequence of network data into a first vector space, the sequence of network data comprising an ordered sequence of the individual time slices;
  constructing a second model that predicts aspects of the network traffic, wherein the second model processes sequences of network data in reverse-time order to learn representations of the network data
  using the second model to embed the sequence of network data into a second vector space, wherein individual time slices from the sequence of network data are provided to the second model in reverse chronological order, and an output of the second model is reversed before being embedded into the second vector space;
  combining output vectors from processing a same individual time slice from both the first model in the first vector space and the second model in a second vector space into a projection layer;
  analyzing the combination of the output vectors corresponding to the sequence of network data to predict an aspect of the network traffic; and
  generating data that indicates a network anomaly if abnormal behavior is identified.

10. The computer program product of claim 9, wherein the set of acts for constructing the first model or the second model further comprise:
  constructing an input layer that is connected with a first randomized weight to at least a recurrent layer from among one or more recurrent layers;
  constructing the one or more recurrent layers that are composed of long short-term memory cells, wherein the long short-term memory cells corresponds to memory blocks;
  constructing a projection layer that corresponds to an embedding layer, wherein the projection layer connects to the one or more recurrent layers with a second randomized weight; and
  constructing an output layer that comprise nodes that correspond to protocols where an input sequence occurs, wherein the output layer is connected to the projection layer.

11. The computer program product of claim 9, wherein the set of acts further comprise constructing a classifier that predicts a port or protocol of the network traffic.

12. The computer program product of claim 9, wherein the first model or the second model predicts a network connection protocol.

13. The computer program product of claim 9, wherein the network flow data comprises information that describe data transferred within periodic time slices with at least one of bytes sent, bytes received, packets sent, packets received, client first, client last, or skip.

14. The computer program product of claim 9, wherein the set of acts further comprise transforming an output of the second model to compensate for the reverse chronological order before sending the output of the second model to a projection layer.

15. A system comprising:
  a computer processor to execute a set of instructions;
  a memory to hold the set of instructions, in which the set of instructions when executed by the computer processor cause a set of acts, the set of acts comprising:
    monitoring network traffic in a network, wherein the network traffic is separated into network flow data that comprises individual time slices;
    constructing a first model that predicts aspects of the network traffic, wherein the first model processes sequences of network data to learn representations of the network data;
    using the first model to embed a sequence of network data into a first vector space, the sequence of network data comprising an ordered sequence of the individual time slices;
    constructing a second model that predicts aspects of the network traffic, wherein the second model processes sequences of network data in reverse-time order to learn representations of the network data;
    using the second model to embed the sequence of network data into a second vector space, wherein individual time slices from the sequence of network data are provided to the second model in reverse chronological order, and an output of the second model is reversed before being embedded into the second vector space;

combining output vectors from processing a same individual time slice from both the first model in the first vector space and the second model in the second vector space into a projection layer;

analyzing the combination of the output vectors corresponding to the sequence of network data to predict an aspect of the network traffic; and generating data that indicates a network anomaly if abnormal behavior is identified.

16. The system of claim 15, wherein the set of instructions further comprise instructions to construct the first model or the second model further by:

constructing an input layer that is connected with a first randomized weight to at least a recurrent layer from among one or more recurrent layers;

constructing the one or more recurrent layers that are composed of long short-term memory cells, wherein the long short-term memory cells corresponds to memory blocks;

constructing a projection layer that corresponds to an embedding layer, wherein the projection layer connects to the one or more recurrent layers with a second randomized weight; and constructing an output layer that comprise nodes that correspond to protocols where an input sequence occurs, wherein the output layer is connected to the projection layer.

17. The system of claim 15, wherein the first model or the second model predicts a network connection protocol or port for the network traffic.

18. The system of claim 15, wherein the set of acts further comprise constructing a classifier that predicts a port or protocol of the network traffic.

19. The system of claim 15, wherein the set of acts further comprise transforming an output of the second model to compensate for the reverse chronological order before sending the output of the second model to a projection layer.

20. The system of claim 15, wherein the data is generated based at least in part on a threshold being exceeded.

* * * * *